No. 819,036. PATENTED MAY 1, 1906.
F. M. ASHLEY.
CUSHION TIRE.
APPLICATION FILED AUG. 3, 1903.

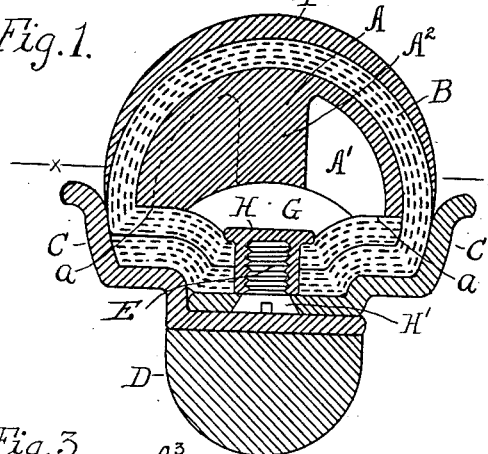
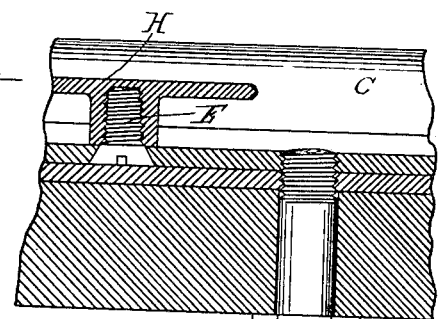
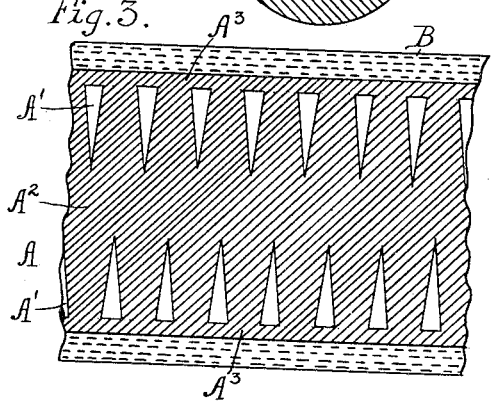
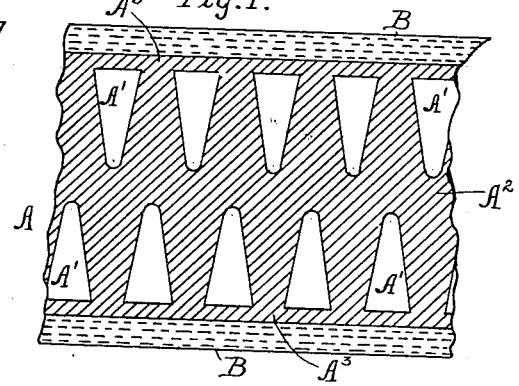
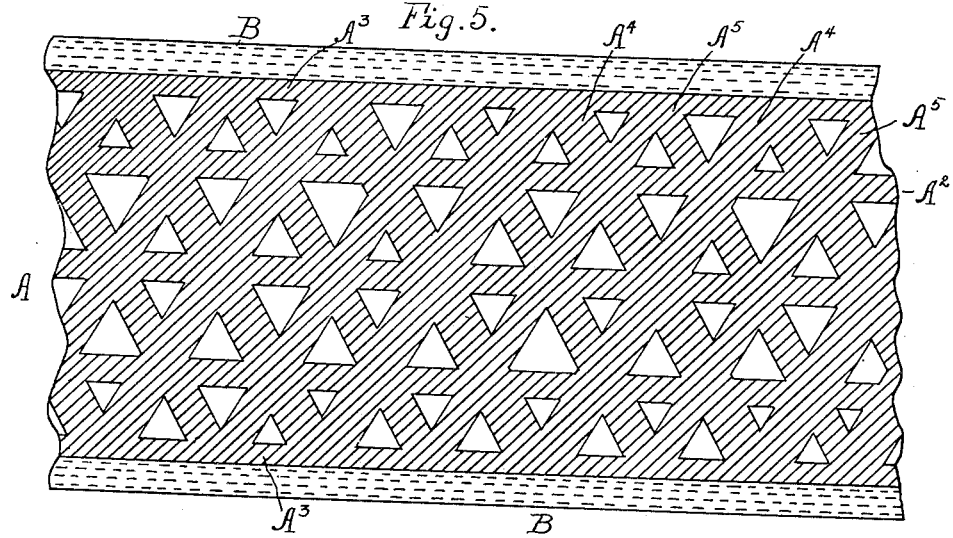

3 SHEETS—SHEET 2.

Witnesses
H. E. Mosher.
William Paxton

Inventor
Frank M. Ashley

No. 819,036. PATENTED MAY 1, 1906.
F. M. ASHLEY.
CUSHION TIRE.
APPLICATION FILED AUG. 3, 1903.
3 SHEETS—SHEET 3.
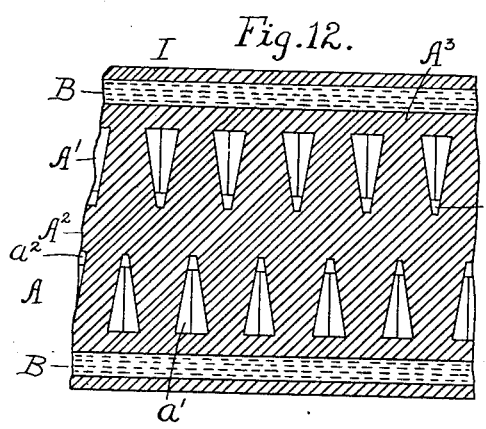
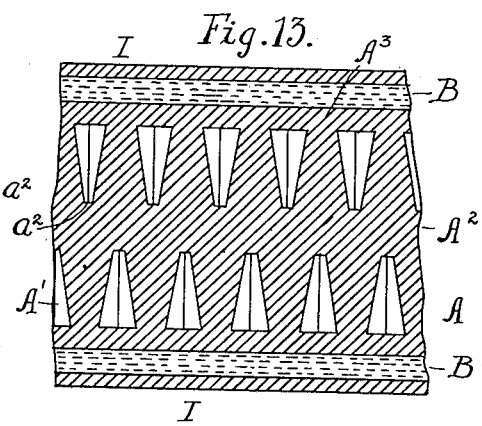
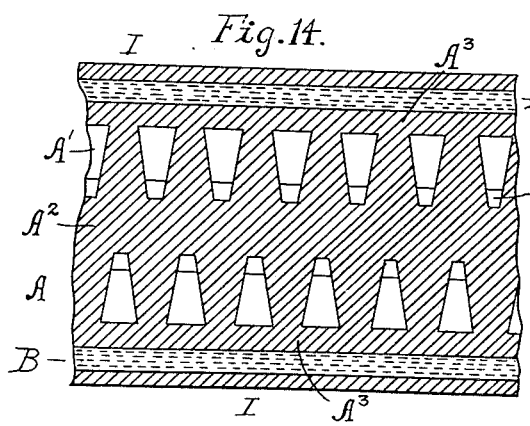
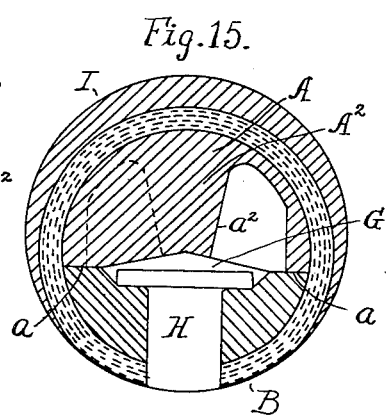
Witnesses
Inventor
Frank M. Ashley

UNITED STATES PATENT OFFICE.

FRANK M. ASHLEY, OF NEW YORK, N. Y.

CUSHION-TIRE.

No. 819,036.  Specification of Letters Patent.  Patented May 1, 1906.

Application filed August 3, 1903. Serial No. 167,984.

*To all whom it may concern:*

Be it known that I, FRANK M. ASHLEY, a citizen of the United States, and a resident of New York, in the county of New York and State of New York, have invented certain new and useful Improvements in Cushion-Tires, of which the following is a specification.

The present invention relates to what are known as "cushion-tires," the object of the invention being the production of a tire capable of satisfactory resiliency and durability with a minimum amount of rubber.

The invention further has in view provision whereby the same core-pieces may be used in different styles of tires and also whereby such core-pieces may be further used with a new cover after the outer cover or tread portion is worn out.

A further object of the invention is to provide novel and efficient means for firmly holding the tire to the wheel-rim.

In carrying out the invention I employ a form of truss construction in such a manner that the truss-sections will assume a condition of tension, which tension will increase with the load. I also provide means whereby the longitudinal strength of the tire is such that excessive stretching in this direction is avoided.

Figure 6:
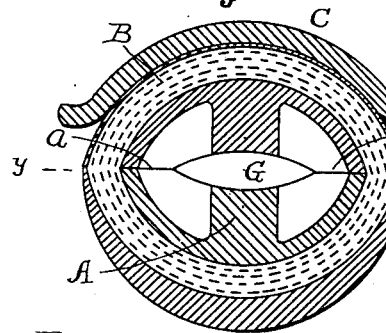
Figure 7:
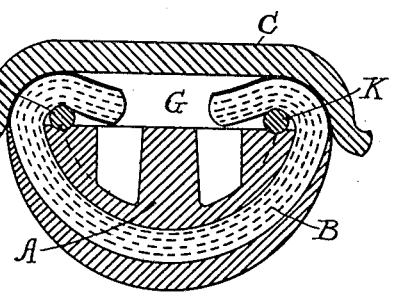
Figure 8:
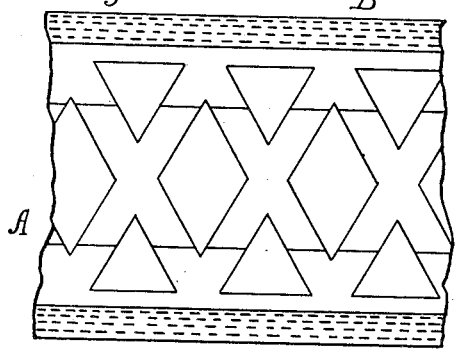
Figure 9:
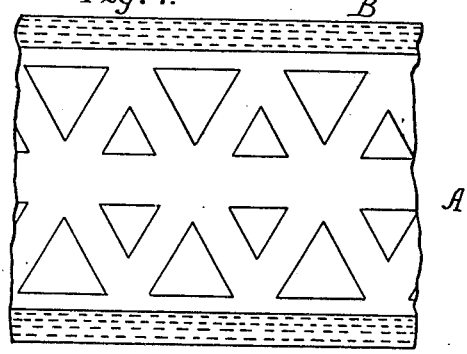
Figure 10:
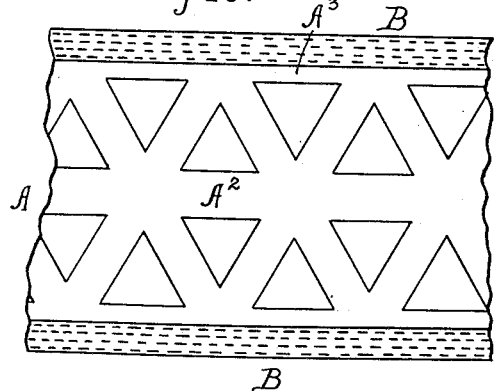
Figure 11:
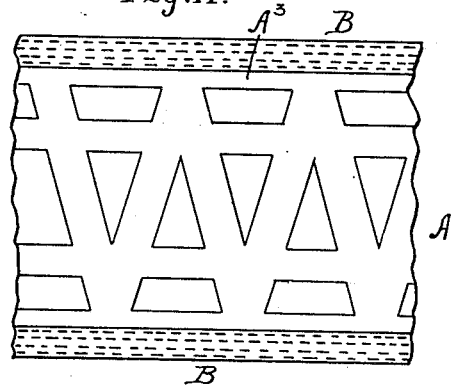

In the accompanying drawings, forming part of this specification, Figure 1 is a cross-sectional view of one style of a tire embodying my invention and also showing the wheel rim, felly, and means securing said tire in the rim. Fig. 2 is a central longitudinal sectional view disclosing the rim, felly, means for securing the tire in the rim, and means holding the rim-sections together. Fig. 3 is a sectional plan view of the tire, the section being in the plane indicated by the broken line $x$ $x$, Fig 1. Fig. 4 is a somewhat similar view, but disclosing larger pockets for more suitably adapting the tire for lighter-weight vehicles than the form illustrated in the preceding figure. Fig. 5 is another sectional plan view illustrating a larger tire and also showing the trusses crossed and strengthened by longitudinal web-sections. Fig. 6 is a transverse section of another form of the tire embodying two of the core-sections laid together to give additional elasticity and providing a construction which may be stretched and sprung into the rim when the latter is in one piece. Fig. 7 is another transverse sectional view, the same illustrating a style of tire somewhat like that disclosed in Fig. 1, the tire, however, being held in the rim by binding-wires. Fig. 8 is a sectional plan of the tire disclosed in Fig. 6, the section being taken in the plane indicated by the broken line $y$ $y$ of said figure. Figs. 9, 10, and 11 are sectional plan views of the tire, the sections being taken in the same plane as Fig. 8 and exhibiting slight modifications. Figs. 12 to 14, inclusive, are longitudinal sections of tires viewed from the inner sides thereof and disclosing further modifications of the invention. Fig. 15 is a transverse sectional view of a tire embodying the construction illustrated in Fig. 13.

Referring to Figs. 1 to 4, inclusive, A indicates the core of the tire; B, the wrapper of canvas or other desired material; C C, the sections constituting the wheel-rim; D, the felly of the wheel; E, the tire-fastening device, and F the means used for securing the rim to the felly of the wheel.

I make the core A so that the same will comprise walls of rubber or other suitable material, which walls are formed to present V-shaped pockets A' in each side of the core. The V shape is imparted to the pockets by cutting appropriate grooves in the molds in which the core is produced, which grooves are at an angle to its longitudinal line and crossing this line at the same angle in the opposite direction, thus forming a mold that will result in a truss construction across the core, as more clearly indicated in Fig. 5.

The width of the pockets A' can be such as to meet the conditions created by the usage of the vehicle. If heavy loads are to be carried, the pockets are made smaller, thus involving more rubber and producing a heavier and stronger tire. For lighter loads the pockets will be larger and the other conditions reversely modified. It will be seen that by this construction a central web A² of rubber can be formed in the core-section, which web extends to the canvas B. This web materially strengthens the tire in its longitudinal direction and relieves the canvas cover B of part of the strain it would otherwise have to stand.

When the tire is subjected to tread compression, this central web is deflected, and as the load pressure is transmitted to the sides of the tire at $a$ $a$, Fig. 1, the side walls A³ of rubber are placed under tension rather than compression, the space or clearance G at the base of the core permitting the web A² to become considerably depressed before it abuts.

As will be comprehended by reference to Fig. 1, the transverse interior edge of the laterally-disposed radial walls is horizontal contiguous to the tire sides, thus providing for the bearing-points a a, previously alluded to, each wall edge containing intermediately of the horizontal bearing portions an extended horizontal arch which coacts to form the clearance-space G.

In making a larger tire, as illustrated in Fig. 5, I prefer to employ several of the longitudinal webs A², distributed to suit requirements, and in this figure I have shown the cross-walls or trusses of different thicknesses—as, for instance, the continued truss A⁴ is of a different thickness than that of the truss A⁵. Therefore I may construct the trusses of any strength that may be desired by using trusses of different thicknesses in the same tire.

As indicated in Fig. 11, I may dispense with the central web A², for if the pockets are made of sufficient length they would extend across the web A², but still leave the truss-walls to receive the load-pressure, and as the walls extend to the canvas B they contribute to form a very effective and resilient tire. This construction locates the rubber just where it is needed in the tire to be of the greatest benefit.

In making the tire the core is formed wrapped with canvas, the lugs H being placed in position at short intervals, and it is then vulcanized in the usual manner.

In securing the tire to the rim I prefer to secure the style of tire shown in Fig. 1, as follows: I roll two sections C C, conjointly adapted to constitute the rim, and shrink the left section onto the felly. The tire is next placed in the right section and screws H' are screwed into the lugs H, thus holding the tire. The tire and associated rim-section are then slipped into position on the wheel, and the whole secured by screwing the bolts J, one of which is shown in Fig. 2, into the bottoms of the rim-sections. This holds the tire securely.

In the style of tire shown in Fig. 6 the core-sections A are laid together, wrapped with canvas B, vulcanized in the usual manner, and the tire thus formed stretched and sprung into position in the rim C, screws and lugs being employed for retaining it.

The tire disclosed in Fig. 7 is held by binding-wires K. The edges of the canvas B may be secured together, if desired, and the wires then drawn tight, the ends of said wires, which extend through holes in the rim, being secured in any convenient manner.

The angular construction of the trusses extending from side to side of the tire with the ends joined results in a cushion effect whereby side thrusts are transmitted to the walls in such a manner as to give a fine cushioning action, and the entire construction is such that no part of the tire can be stretched beyond the elastic limit of the sections.

The core portion may be vulcanized to the canvas wrapper or left free, as circumstances may require.

When the tread-section I becomes worn, a new section may be vulcanized in position, thus providing for double wear.

In Fig. 12 the arrangement of core A is such that not only do the wall a' of the pockets A' converge toward the central web A² but such walls are also beveled or inclined toward each other in the direction of the tire-tread. It will, furthermore, be comprehended that the core is fashioned to present an inner end a² for each pocket, which inclines in the direction of the vertical center of the core. As will be readily appreciated, when compression is incurred at the tread-surface of the tire the core is inwardly deflected, resulting in the walls a' being brought more or less in mutual contact, according to the degree of compression, and such contact occurring progressively from the direction of the outer convergences of the walls. The effect of such contact of the surface-walls is to reduce the elasticity of the core and increase the capacity of the same for resisting longitudinal strain. Moreover, the increase in the core rigidity serves to transfer the load compression to the side walls A³, to be borne by the latter, and which in the meantime have been reinforced by the tension under which the core is placed. Another feature connected with this arrangement of core is that when the latter experiences tread compression, as aforesaid, the deflection of the central web results in the end walls a² assuming more nearly a vertical position, thus greatly augmenting the tension effect previously mentioned.

In the type of core illustrated in Fig. 13 the pockets A' are somewhat more ample than are those represented in the previous figures. Furthermore, in this said Fig. 13 the end walls a² are not inclined. In Fig. 14 the walls a' are not inclined, but the end walls a² are. Many of the functions for which the construction of Fig. 12 is adapted will also be performed by the constructions of the succeeding figures, as will be readily apparent.

I do not desire to be understood as limiting myself to the particular features and arrangements of parts shown and described, but reserve the right to all modifications that may be within the scope of my invention.

Having now described my invention, what I claim as new, and desire to secure by Letters Patent, is—

1. A tire portion comprising yielding side walls contributing to form an inner recess, radial walls integral with and laterally disposed, said radial walls being integral with a tire portion in the inner side thereof and presenting interiorly-extended transverse edges containing transversely-extended radial arches forming a clearance or space for promoting the movements of the tire under tread compression, and a radial longitudinal web intersecting the radial walls and extending continuously from the roof of the arch to the top of the tire portion.

2. A tire portion presenting integrally-yielding side walls contributing to form an inner recess, radial walls integral with and laterally disposed, said radial walls being integral with a tire portion in the inner side thereof and presenting interiorly-extended transverse edges containing transversely-extended radial arches forming a clearance or space for promoting the movements of the tire under tread compression, and a radial longitudinal web intersecting the radial walls and extending continuously from the roof of the arch to the top of the tire portion.

3. A tire portion comprising yielding side walls contributing to form an inner recess, and radial walls in a longitudinal series within said recess and also yielding, each of said radial walls being laterally oblique, integral with said side walls and continuously spanning said recess.

4. A tire portion comprising yielding side walls contributing to form an inner recess, a radial longitudinal web within said recess, and radial walls at opposite sides of the web, said radial walls being laterally oblique and integral with the said side walls.

5. In a tire, a core containing an inner recess and radial walls within the latter and integral with said core, said walls being each laterally oblique and continuously spanning said recess at both sides of the radial center thereof.

6. In a tire, a core-section comprising a flexible material and containing an inner longitudinally-extending recess, and radial walls within the latter and integral with the core-section, said walls being laterally oblique and continuously spanning said recess.

7. In a tire, a core containing an inner longitudinally-extending recess, a longitudinal web within said recess and integral with the core, and radial walls obliquely disposed within and each spanning the recess.

8. In a tire, a flexible core containing an inner longitudinally-extending recess, a plurality of longitudinal webs within said recess and integral with the core, and integral radial walls obliquely disposed within and each spanning the recess.

9. In a tire, a core containing an inner longitudinally-extending recess, radial walls integral with the said core and each obliquely disposed within and continuously spanning said recess, and a flexible covering for the core.

10. In a tire, a core containing an inner longitudinally-extending recess, a longitudinal web within said recess and integral with the core, integral lateral walls obliquely within and each spanning said recess, and a flexible covering for the core.

11. In a tire, a core containing an inner longitudinally-extending recess, a plurality of longitudinal webs within said recess and integral with the core, integral lateral walls obliquely within and each spanning said space, and a covering for the core.

12. A tire embodying side walls and a longitudinal web, the latter for limiting the longitudinal strain but adapted to recede under tread compression, and a plurality of laterally oblique connections at each side of the web for placing said side walls under tension when tread compression is incurred.

13. A tire embodying side walls presenting an intermediate inner recess, a longitudinal web within such recess and integrally supported at its outer edge, and oblique truss-sections integrally connecting the web and side walls and spanning the recess.

14. The combination with a felly and wheel-rim, the latter comprising two sections overlapping at the felly, of a yielding tire containing lugs provided with longitudinally-extended heads interiorly clamping the tire, screws bearing in one of the overlapping rim portions and engaging the lugs and bolts bearing in the felly and engaging both overlapping portions of the rim-sections.

15. In a tire, an integral core of flexible material having laterally-disposed V-shaped openings contracting in the direction of the core-center and open at their inner sides.

16. A tire portion comprising yielding side walls contributing to form an inner recess, and radial walls in a longitudinal series within said recess, said walls presenting interior edges embodying side horizontal bearing portions and intermediate extended horizontal arch, the latter coacting to form an inner clearance-space for promoting the movements of the walls under tread compression.

17. A tire portion comprising yielding side walls contributing to form an inner recess, and radial walls in a longitudinal series within and transversely spanning said recess, certain of said radial walls partaking of a horizontal obliquity in a direction opposite to the lateral obliqueness of the other walls.

18. A tire portion comprising yielding side walls contributing to form an inner recess, and radial walls in a longitudinal series within said recess, certain of said radial walls being laterally oblique and intersecting certain of the other radial walls to form horizontally-contracting interspaces.

19. A tire portion comprising yielding side walls contributing to form an inner recess, and radial walls in a longitudinal series with said recess, certain of said radial walls partaking of a horizontal obliquity in a direction opposite to the lateral obliqueness of the other radial walls whereby the walls mutually intersect and form horizontally-contracting interspaces.

20. A tire portion comprising yielding side walls contributing to form an inner recess, a longitudinal radial web within said recess, and radial walls also within said recess and intersecting the web at an angle, certain of said radial walls partaking of a horizontal obliquity in a direction opposite to the lateral obliqueness of the other walls.

21. A tire portion comprising yielding side walls contributing to form an inner recess, and radial walls in a longitudinal series therein and presenting horizontally-contracting interspaces, one of the surfaces forming which is radially inclined.

22. A tire portion comprising yielding side walls contributing to form an inner recess, and radial walls in a longitudinal series therein and presenting horizontally-contracting interspaces, the opposite wall surfaces of each space being mutually radially converged.

Signed at New York, in the county of New York and State of New York, this 7th day of July, A. D. 1903.

FRANK M. ASHLEY.

Witnesses:
WILLIAM PAXTON,
HELEN E. MAHER.